United States Patent
Hehmann et al.

(10) Patent No.: US 8,452,173 B2
(45) Date of Patent: May 28, 2013

(54) OPTICAL NETWORK, MONITORING UNIT AND MONITORING METHOD

(75) Inventors: Jörg Hehmann, Weil der Stadt (DE); Harald Schmuck, Schwieberdingen (DE); Michael Straub, Maulbronn (DE)

(73) Assignee: Alcatel Lucent, Paris (FR)

( * ) Notice: Subject to any disclaimer, the term of this patent is extended or adjusted under 35 U.S.C. 154(b) by 951 days.

(21) Appl. No.: 12/108,497

(22) Filed: Apr. 23, 2008

(65) Prior Publication Data

US 2009/0232494 A1  Sep. 17, 2009

(30) Foreign Application Priority Data

Apr. 26, 2007 (EP) ..................................... 07290531

(51) Int. Cl.
 *H04B 17/00* (2006.01)
 *H04J 14/00* (2006.01)
(52) U.S. Cl.
 USPC ......... 398/25; 398/77; 398/9; 398/43; 398/16
(58) Field of Classification Search
 USPC .............................................. 398/25, 43, 77
 See application file for complete search history.

(56) References Cited

U.S. PATENT DOCUMENTS

| | | | | |
|---|---|---|---|---|
| 4,820,916 A * | 4/1989 | Patriquin | ................... | 250/208.2 |
| 6,718,141 B1 | 4/2004 | Devette | | |
| 7,321,730 B2 * | 1/2008 | Felske et al. | ..................... | 398/71 |
| 7,684,702 B2 * | 3/2010 | Lu | ................................... | 398/67 |
| 8,014,670 B2 * | 9/2011 | Moore et al. | .................... | 398/33 |
| 2004/0047628 A1 | 3/2004 | Passier | | |
| 2004/0156635 A1 * | 8/2004 | Felske et al. | ..................... | 398/66 |
| 2006/0029390 A1 * | 2/2006 | Schmuck et al. | ............... | 398/33 |
| 2006/0115270 A1 | 6/2006 | Kim | | |
| 2006/0133806 A1 * | 6/2006 | Krimmel | ........................ | 398/33 |
| 2006/0188090 A1 * | 8/2006 | Paulsen et al. | ........... | 379/413.04 |
| 2006/0207646 A1 | 9/2006 | Terreau et al. | | |
| 2007/0264021 A1 * | 11/2007 | Li et al. | ......................... | 398/135 |
| 2009/0202238 A1 * | 8/2009 | Straub et al. | .................... | 398/25 |

FOREIGN PATENT DOCUMENTS

| | | |
|---|---|---|
| EP | 0 350 951 A2 | 1/1990 |
| EP | 1578038 A1 | 9/2005 |
| GB | 2292495 A | 2/1996 |
| JP | B2-63-46783 | 9/1986 |
| JP | A-62-152183 | 7/1987 |
| JP | A-2007-527109 | 9/2007 |

OTHER PUBLICATIONS

European Search Report dated Oct. 4, 2011 in European Application No. 11 004123.3.

* cited by examiner

*Primary Examiner* — Shi K Li
*Assistant Examiner* — Rajsheed Black-Childress
(74) *Attorney, Agent, or Firm* — Harness, Dickey & Pierce

(57) ABSTRACT

An optical network having a tree-like structure with a main line and a plurality of branches, at least two of the branches comprising a monitoring unit for upstream signalling to the main line, wherein each of the monitoring units comprises a signal generation unit with a light source for generation of a pre-defined optical signal, and the monitoring units are construed to generate pre-defined optical signals which are different from each other, as well as a monitoring unit for generating a periodic upstream signal in such an optical network and a method for monitoring such an optical network.

9 Claims, 2 Drawing Sheets

OPTICAL NETWORK, MONITORING UNIT AND MONITORING METHOD

BACKGROUND OF THE INVENTION

The invention is based on a priority application EP 07290531.8 which is hereby incorporated by reference.

The invention relates to an optical network having a tree-like structure with a main line and a plurality of branches, at least two of the branches comprising a monitoring unit for upstream signalling to the main line, to a monitoring unit for generating a periodic upstream signal in such an optical network, and to a monitoring method for such an optical network.

In order to improve the quality of service in optical networks, in particular Passive Optical Networks (PONs) with a tree-like structure, continuous monitoring techniques detecting and localizing faults are of special interest, as they are expected to provide substantial cost savings to telecommunications companies operating these networks.

EP 1 578 038 A1 discloses an optical network which comprises an optical monitoring termination (OMT) at a head end of a main line of the network and at least one optical monitoring unit (OMU) connected to a branch of the network. The OMT and the OMU are arranged for communicating with each other using a dedicated monitoring wavelength which is extracted from the optical path between the OMT and the OMU using a wavelength-selective device, in particular a WDM (Wavelength-Division-Multiplex) coupler. The OMU comprises a reflective optical element which is switchable, i.e. in its "on" state reflects light at the extracted monitoring wavelength back to the optical path via the WDM coupler.

In the article "High Spatial Resolution PON Measurement Using an OTDR Enhanced with a Dead-zone-free Signal Analysis Method" by N. Araki et al., Optical Fiber Measurements, Technical Digest, 2004, Pages 69-72, a high spatial resolution OTDR measurement method for PONs is described which uses optical filters such as fiber Bragg gratings (FBGs) which are installed at the subscriber end of optical fiber lines of the PON and which allow a communication light to pass but reflects a test light. Using the signals reflected from the FBG filter, signal analysis is possible also in an attenuation dead zone just behind the Fresnel reflection of an optical splitter in the network.

The article "A New Fault-Identification Method Using a Dichroic Reflective Optical Filter in Optical Subscriber Loops" by H. Takasugi et al., Journal of Lightwave Technology, Vol. 11, No. 2, 1993, pp. 351-357 describes a method with which faults in an optical fiber line of an optical network can be identified by inserting a dichroic filter at the end of the fiber line, the filter reflecting light at a test wavelength and allowing light at a communication wavelength to pass. The level and distance of reflection from the filter are measured with an optical time domain reflectometer (OTDR) from the central office of the network.

In the approaches as described above, a high-power light source is required which may induce extra noise contributions to the data signal. Moreover, expensive equipment (high resolution OTDR or tunable laser source) is required for detection of the reflected signal at the central office.

SUMMARY OF THE INVENTION

It is the object of the invention to improve an optical network, a monitoring unit and a monitoring method as described above in such a way that fault detection within the network can be performed in a reliable and cost-effective way.

This object is achieved by an optical network wherein each of the monitoring units comprises a signal generation unit with a light source for generation of a pre-defined optical signal, and the monitoring units are construed to generate pre-defined optical signals which are different from each other. The upstream signals of the individual branches are combined in a switch which connects the main line with the individual branches of the network. By using different optical signals for the upstream signalling of each branch, it is possible to extract these signals also from the combined signal in the main line and to assign each unique signal to the corresponding monitoring unit. A missing upstream signal from a specific monitoring unit indicates a fault in the corresponding branch. The transmission wavelength of the upstream signals may be chosen arbitrarily, although coincidence with the downstream wavelength should be avoided for ensuring a transparent solution. In the solutions described in the state of the art, the monitoring signal propagates downward and upward throughout the network, such that a high power light source and a sensitive detector at the central office are required. In the solution described above, the monitoring signals only propagate upstream from the monitoring units to the central office, thus allowing to use low optical power sources in the monitoring units and a less sensitive detector at the central office.

In a preferred embodiment, the signal generation units are construed to generate periodic signals having periodicities which are different from each other. Such signals can be produced in a cost-effective way (see below) and recovery of the individual signals from the superimposed signal in the main line is relatively easy. The assignment between the periodicities of the optical signals and the monitoring units is made during installation of the network and is thus known to the operator of the network. The assignment data is stored in a table at the central office which will be updated when an extension of the network with the addition of new branches takes place.

In a further preferred embodiment, the signal generation units are construed to generate optical signals, in particular binary signals, including patterns which are different from each other. In this case, the individual signals—which are in general non-periodic—are recovered at the head end by correlating them with patterns which are characteristic for the individual monitoring units.

In an advantageous embodiment, the signal generation unit of at least one monitoring unit is construed to code status information about the monitoring unit into the pre-defined optical signal. This status information may include information e.g. about the temperature of the monitoring unit. In case of periodic signals the coding may be performed using an amplitude modulation, in case of non-periodic signals by use of specific (bit-)patterns which may follow the unique bit patterns which are required for the identification of the monitoring units.

In a highly preferred embodiment, the optical network further comprises a signal processing unit connected to the main line for recovering the different pre-defined optical signals from the upstream signal in the main line. The signal processing unit is in general connected to the main line via an o/e-conversion element and performs analysis of the superimposed signal by either searching for periodic signals in the superimposed signal or by correlating patterns in the superimposed signal with specific patterns being characteristic for the monitoring units.

In another preferred embodiment, at least one monitoring unit comprises an electrical power supply, in particular a battery. In this case, the monitoring unit is a stand-alone device which does not require an external power source.

In a further preferred embodiment, at least one monitoring unit comprises an o/e-conversion element, in particular a photodiode, which is connected to the branch, the o/e-conversion element being in operative connection with an energy storage, in particular a capacitor, the energy storage being in operative connection with the signal generation unit. In this case, the monitoring unit is a remotely-powered device which couples out a small part (e.g. 5%) of the optical power transmitted in the downstream direction in the optical network. The light is converted into electrical power by the photo diode and stored in the capacitor. Such a remote-powered solution may be used with monitoring units with generate periodic or non-periodic optical signals.

The invention is also realized in a monitoring unit for generating a periodic upstream signal in an optical network as described above, the monitoring unit comprising: a signal generation unit with a light source and an o/e-conversion element, both construed for connection to a branch of the network, an energy storage, in particular a capacitor, in operative connection with the o/e-conversion element, and a switch for activating an electrical connection between the energy storage and the signal generation unit when a pre-defined threshold level of the energy stored in the energy storage is reached. The monitoring unit as described above uses the optical power extracted from the downstream signal not only for powering of the signal generation unit, but also for generating periodic signals in an easy and very cost-effective way.

The invention is further realized in a monitoring method for an optical network having a tree-like structure with a main line and a plurality of branches, at least two of the branches comprising a monitoring unit for upstream signalling to the main line, the method comprising the steps of: generating pre-defined optical signals in signal generation units within each of the monitoring units, the pre-defined optical signals of the monitoring units being different from each other, and recovering the different pre-defined optical signals from the upstream signal in the main line. The monitoring method as described above allows monitoring of the optical network by using signals which are transmitted only in the upstream direction, such that light sources with a relatively low power can be used in the signal generation units of the monitoring units.

In a highly preferred variant, the method comprises the additional step of analyzing the pre-defined optical signals for extracting status information about the monitoring units which is coded into the pre-defined optical signals by the monitoring units. In this way, in addition to the identification of the monitoring units at the central office, the status of the monitoring units can also be checked.

Further characteristics and advantages of the invention are provided in the following description of exemplary embodiments of the invention, with reference to the figures of the drawing, which shows details that are significant in the context of the invention, and in the claims. The individual characteristics can be implemented individually by themselves, or several of them can be implemented in any desired combination in a variant of the invention.

DETAILED DESCRIPTION OF THE DRAWINGS

Figure 1:
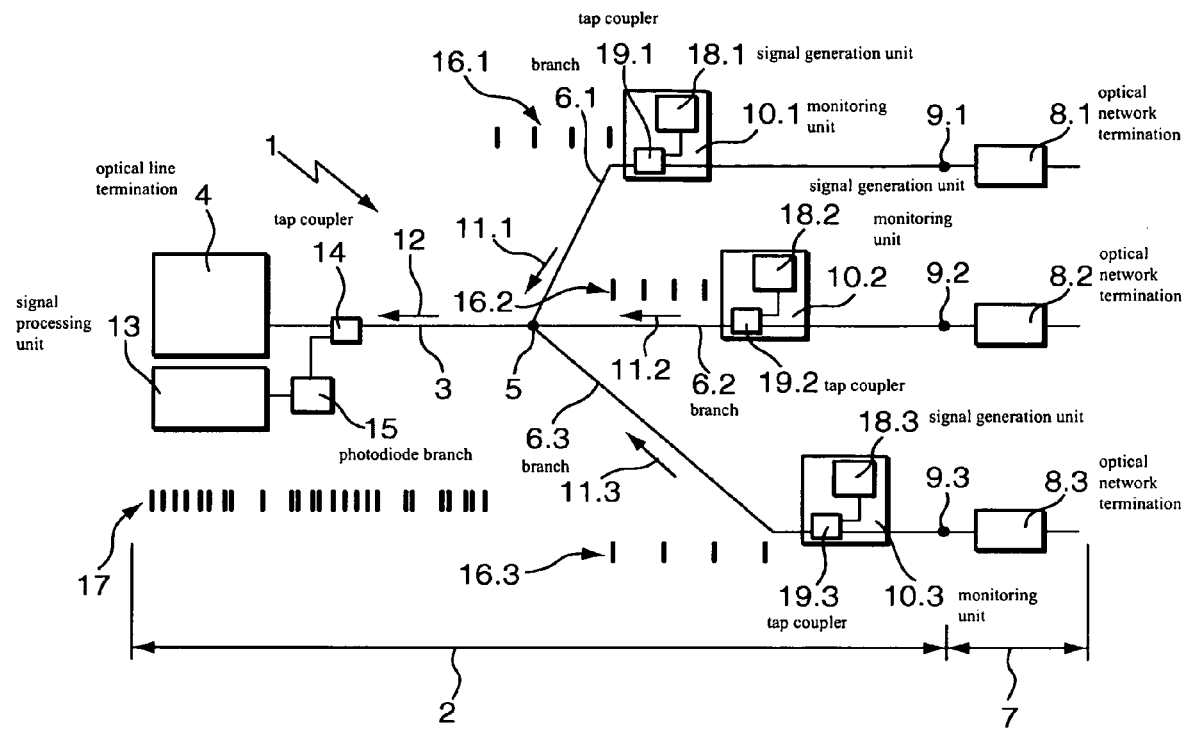
FIG. 1 shows a schematic representation of an embodiment of an optical network according to the invention.

FIG. 1 shows a passive optical network 1 which comprises a tree-like operator network 2 as a first section. The operator network 2 has a main fiber line 3 being located between an Optical Line Termination (OLT) 4 and a 1×N passive optical distribution network (switch) 5 connecting the main line 3 with a number N of branches, three of which (6.1 to 6.3) are shown in FIG. 1. The branches 6.1 to 6.3 of the operator network 2 are continued in a user network 7 which constitutes a second section of the optical network 1 and which comprises Optical Network Terminations (ONTs) 8.1 to 8.3, one for each of the branches 6.1 to 6.3. A so-called demarcation point 9.1 to 9.3 marks the limit between the operator network 2 and the user network 7 in each of the branches 6.1 to 6.3. In the operator network 2, a monitoring unit 10.1 to 10.3 is arranged adjacent to each of the demarcation points 9.1 to 9.3, which, due to its position in the optical network 1, is also referred to as a demarcation point monitor (DPM). The monitoring units 10.1 to 10.3 help the operating company of the operator network 2 to check the network availability from the OLT 4 up to the demarcation points 9.1 to 9.3 and to separate between network failures from its own network 2 and from the user network 7, the monitoring units 10.1 to 10.3 operating independently from the ONTs 8.1 to 8.3.

As the operator is responsible for faults occurring in the operator network 2, e.g. due to fiber breaks, it has to monitor the network 1 continuously to spot possible defects. Due to the large distances which are covered by the fiber links in the network 1, the operator generally only has access to the network 1 via the OLT 4, also referred to as central office, and has to check the correct operability of the network 1 from this site all the way down to the demarcation points 9.1 to 9.3.

For monitoring of the optical network 1 from the OLT 4, each of the monitoring units 10.1 to 10.3 generates a pre-defined optical signal 11.1 to 11.3 which is transmitted upstream to the main line 3, the signals 11.1 to 11.3 from the different branches 6.1 to 6.3 forming a superimposed optical signal 12 when entering into the main line 3 at the splitter 5.

At the head end of the main line 3, a signal processing unit 13 is arranged which is connected to the main line 3 via a tap coupler 14 and a photodiode 15 for o/e-conversion of the signal coupled out from the main line 3. The signal processing unit 13 comprises a processor for analyzing the o/e-converted superimposed signal 12 from the main line 3. In order for the signal processing unit 13 to distinguish between the signals 11.1 to 11.3 from the different branches 6.1 to 6.3 in the superimposed signal 12, the pre-defined optical signals 11.1 to 11.3 of the monitoring units 10.1 to 10.3 are chosen to be different from each other, i.e. each of the optical signals 11.1 to 11.3 has a different, unique signature.

For the purpose of generating such a unique signature, the pre-defined optical signals 11.1 to 11.3 generated in the monitoring units 10.1 to 10.3 are chosen to have different periodicities 16.1 to 16.3 which are represented in FIG. 1 for each of the signals 11.1 to 11.3 by a varying distance between four vertical lines. The form of the superimposed signal 12 resulting from the periodic signals 11.1 to 11.3 is represented by vertical lines 17 in FIG. 1. The superimposed signal 12 is non-periodic, yet composed of the periodic signals 11.1 to 11.3, such that, by analyzing the signal 12 for beat frequencies, recovery of the different optical signals 11.1 to 11.3 is possible in the signal processing unit 13. The signal processing unit 13 then assigns the period of each of the signals 11.1 to 11.3 to the corresponding monitoring unit 10.1 to 10.3 in the optical network 1, the resulting assignment being stored in a table within the OLT 4 which is in operable connection to the signal processing unit 13 (not shown). When the signal processing unit 13 detects the absence of one of the signals 11.1 to 11.3 in the superimposed signal 12, the corresponding monitoring unit 10.1 to 10.3 which does not transmit a signal can be identified. Consequently, the corresponding branch 6.1 to 6.3 can be inspected for defects, e.g. fiber breaks, and possible defects can be repaired.

Figure 2:
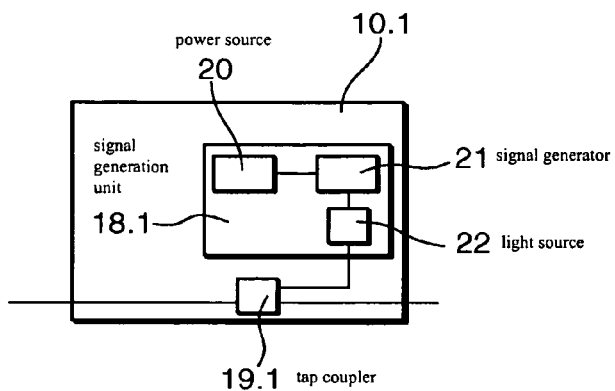
FIG. 2 shows a schematic representation of a monitoring unit for the optical network of FIG. 1, FIG. 3a,b show schematic representations of an embodiment of an optical monitoring unit according to the invention in a first state of operation (FIG. 3a) and in a second state of operation (FIG. 3b)

For the purpose of generating periodic signals, each of the monitoring units 10.1 to 10.3 comprises a signal generation unit 18.1 to 18.3 connected to the corresponding branch 6.1 to 6.3 via a tap coupler 19.1 to 19.3 for sending the upstream signals 11.1 to 11.3 to the main line 3. FIG. 2 shows the first of the monitoring units 10.1 with the signal generation unit 18.1 comprising a battery as a power source 20, a signal generator 21 and a laser diode as a light source 22. The signal generator 21 controls the electrical power supplied to the laser diode in such a way that a periodic signal 11.1 (see FIG. 1) with a pre-determined periodicity 16.1 is generated. In order to be able to generate a unique frequency for each monitoring unit 18.1 to 18.3, either signal generation units 18.1 to 18.3 of different construction are used, or the signal generation units 18.1 to 18.3 are set up to generate signals with a pre-defined periodicity 16.1 to 16.3 during installation of the monitoring units 10.1 to 10.3, e.g. by using a tunable signal generator 21.

As an alternative to the generation of periodic signals described above, it is also possible to use signal generation units 18.1 to 18.3 which are construed to generate non-periodic signals with an unique ID or with a specified pattern, in particular when the signal generator 21 is construed for generating binary signals. In this case, the bit patterns in the superimposed signal 12 are detected either in the processing unit 13 or the OLT 4 and are correlated with bit patterns stored in a table for assigning each of the bit patterns 10.1 to 10.3 to one of the monitoring units 10.1 to 10.3.

Additional information about the status of the monitoring units 10.1 to 10.3, e.g. their temperature, can be coded into the signals 11.1 to 11.3. The provision of the additional information can be achieved e.g. by using an amplitude modulation of the periodic signals, or, in case that binary signals are used, by specific bit patterns, e.g. following the bit patterns which allow for identification of the specific monitoring units 10.1 to 10.3.

Figures 3A, 3B:
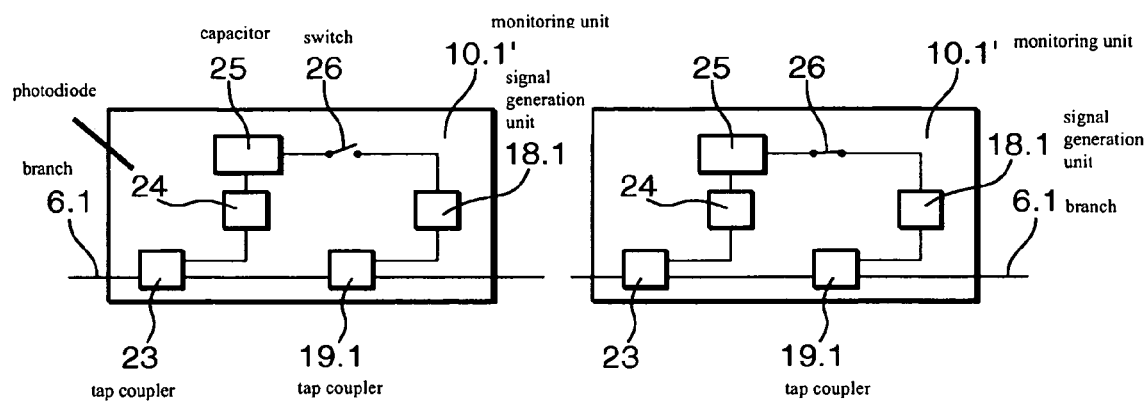
Figure 4:
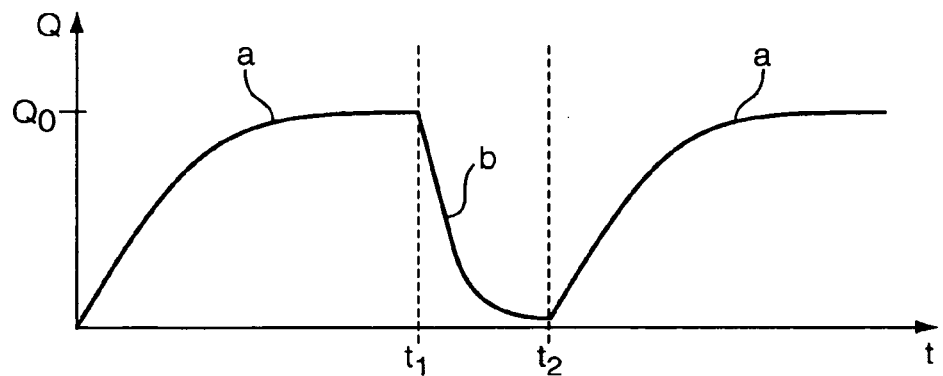
FIG. 4 shows a schematic representation of the charging status of a capacitor in the monitoring unit of FIG. 3.

The monitoring unit 10.1 shown in FIG. 2 uses a battery 20 as a power source and is therefore a stand-alone device which is independent of the corresponding OLT 8.1. Alternatively, it is possible to provide a connection to an external power source, e.g. by branching the monitoring unit 10.1 to an electrical network. Another way to provide a monitoring unit 10.1' with electrical power is to use a remote optical power supply, as shown in FIG. 3*a,b*. The monitoring unit 10.1' comprises an additional tap coupler 23 which is used to branch about 5% of the intensity from the downstream signal (not shown) transmitted from the OLT 4 to the branches 6.1 to 6.3. The optical energy is converted via a photodiode 24 to electrical energy which is stored in a capacitor 25, the charging status of which is shown in FIG. 4. The electrical energy (respectively charge Q) is accumulated in the capacitor 25 until a threshold value $Q_0$ (of maximum charge) is attained (curve a of FIG. 4). At that point of time $t_1$ a switch 26 which links the capacitor 25 to the signal generation unit 18.1 consisting only of a laser diode (not shown) is closed (see FIG. 3*b*). The discharge current of the capacitor 25 is then used to operate the laser source (not shown) of the signal generation unit 18.1, thus reducing the stored energy (curve b of FIG. 4) until the charge in the capacitor 25 is used up at a later point of time $t_2$. By repeating this cycle, a periodic signal is generated, the periodicity and duration of which are dependent of the capacity of the capacitor 25 and the power consumption of the light source. Therefore, upon varying these parameters for different monitoring units, signals having a unique periodicity and time duration can be generated. Of course, it is also possible to vary the threshold value $Q_0$ of the capacitor for this purpose, which allows one to use monitoring units of identical construction, the different threshold values being set during installation.

In summary, a low-cost solution for network operators to supervise their optical fiber plant is provided, as no expensive equipment is needed at the central office (neither tunable light source nor high-resolution OTDR). The solution can be integrated into the network management environment, and as the monitoring signal only propagates in the upstream direction, the optical power required in the monitoring unit and the sensitivity of the detector at the head end of the fiber line can be reduced compared to solutions using monitoring signals which are reflected at the location of the monitoring units. The monitoring units can be connected easily within the network and the demarcation point can be moved with the network extension. Moreover, the solution is transparent, as the data channels are not influenced, provided that the upstream transmission wavelength is chosen to be different from the downstream transmission wavelength.

The invention claimed is:

1. A passive optical network, comprising:
 a tree-like structure with a main line and a plurality of branches extending from a switch to optical network terminations of a user network, at least two of the branches including; and
 monitoring units, between the switch and respective ones of the optical network terminations, for upstream signaling to the main line, each of the monitoring units including a signal generation unit with a light source, each signal generation unit configured to generate an optical signal with a period different from that of the optical signal of other monitoring units in the passive optical network;
 wherein the passive optical network is configured to superimpose the optical signals of the monitoring units at the main line so that in a length of time corresponding to a longer period or a longest period of any of the optical signals with different periods, the superimposed signal includes at least one period of each of the optical signals with the different periods.

2. The passive optical network of claim 1, wherein each signal generation unit is configured to generate binary optical signals including patterns different from the patterns of the binary optical signals of the other monitoring units in the passive optical network.

3. The passive optical network of claim 1, wherein the signal generation unit of at least one of the monitoring units is configured to code status information about the at least one of the monitoring units into the optical signal of the at least one of the monitoring units.

4. The passive optical network of claim 1, including a signal processing unit connected to the main line and configured to recover the optical signals from the superimposed signal.

5. The passive optical network of claim 1, wherein at least one of the monitoring units includes an electrical power supply.

6. The passive optical network of claim 1, wherein at least one of the monitoring units includes an optical-to-electrical (o/e)-conversion element connected to the branch corresponding to the at least one of the monitoring units,
   wherein the o/e-conversion element is connected to an energy storage, and
   wherein the energy storage is connected to the signal generation unit of the at least one of the monitoring units.

7. A monitoring unit configured to generate a periodic upstream signal in the passive optical network of claim 1, comprising:
   a signal generation unit including a light source and an optical-to-electrical (o/e)-conversion element, the light source and the o/e-conversion element configured to connect to a branch of the passive optical network;
   an energy storage connected to the o/e-conversion element; and
   a switch configured to activate an electrical connection between the energy storage and the signal generation unit when a threshold level of energy stored in the energy storage is reached.

8. A monitoring method for a passive optical network having a tree-like structure with a main line and a plurality of branches extending from a switch to optical network terminations, at least two of the branches each including a monitoring unit configured to signal upstream to the main line, the method comprising:
   generating, by each of the monitoring units, an optical signal with a period different from the optical signal of other monitoring units of the passive optical network, each of the monitoring units being between the switch and a respective one of the plurality of optical network terminations;
   superimposing the optical signals of the monitoring units at the main line so that in a length of time corresponding to a longer period or a longest period of any of the optical signals with different periods, the superimposed signal includes at least one period of each of the optical signals with the different periods; and
   recovering the optical signals from the superimposed optical signal.

9. The monitoring method of claim 8, including analyzing the optical signals for extracting status information about the monitoring units, the status information being coded into the optical signals by the monitoring units.

* * * * *